(12) United States Patent
Kieffer et al.

(10) Patent No.: US 11,174,678 B2
(45) Date of Patent: Nov. 16, 2021

(54) LOCKING ASSEMBLY FOR A TELESCOPING LADDER

(71) Applicant: Core Distribution, Inc., Minneapolis, MN (US)

(72) Inventors: Mitchell I. Kieffer, Key Biscayne, FL (US); Nathan L. Schlueter, Bloomington, MN (US)

(73) Assignee: Core Distribution, Inc., Minneapolis, MN (US)

( * ) Notice: Subject to any disclaimer, the term of this patent is extended or adjusted under 35 U.S.C. 154(b) by 474 days.

(21) Appl. No.: 16/180,470

(22) Filed: Nov. 5, 2018

(65) Prior Publication Data
US 2019/0136623 A1 May 9, 2019

Related U.S. Application Data

(60) Provisional application No. 62/583,230, filed on Nov. 8, 2017.

(51) Int. Cl.
*E06C 7/50* (2006.01)
*E06C 1/12* (2006.01)
(Continued)

(52) U.S. Cl.
CPC ............... *E06C 7/50* (2013.01); *E06C 1/125* (2013.01); *E06C 7/08* (2013.01); *E06C 7/086* (2013.01); *E06C 7/087* (2013.01); *F16B 7/105* (2013.01)

(58) Field of Classification Search
CPC . E06C 7/08; E06C 7/086; E06C 7/087; E06C 7/50; E06C 1/125; F16B 7/105
(Continued)

(56) References Cited

U.S. PATENT DOCUMENTS 329,494 A  11/1885 Schweinfurt
872,165 A  11/1907 Adler
(Continued)

FOREIGN PATENT DOCUMENTS

AU  4379779 A1  8/1980
CA  2157842 A1  3/1997
(Continued)

OTHER PUBLICATIONS

Brochure, The World's Broadest Line of Telescopic Ladders, pp. 2-3. www.telesteps.com. 2009.
(Continued)

*Primary Examiner* — Alvin C Chin-Shue
*Assistant Examiner* — Candace L Bradford
(74) *Attorney, Agent, or Firm* — Fredrikson & Byron, P.A.

(57) ABSTRACT

Embodiments include a telescoping ladder with a plurality of columns and rungs. The ladder can have a plurality of locking assemblies for locking adjacent columns to a rung thereby restricting relative sliding motion between adjacent columns. The locking assembly can have a locking button positionable against the rung front surface and rotatable with respect thereto between a locked position and an unlocked position. The locking assembly can have a locking pin positioned within the rung and slidable between an extended position and a retracted position along a locking pin axis generally perpendicular to the rotational axis. The locking assembly can have a connector pin extending in a direction parallel to the rotational axis, for connecting the locking button to the locking pin such that rotation of the locking button about the rotational axis slides the locking pin about the locking pin axis.

20 Claims, 8 Drawing Sheets

(51) Int. Cl.
*F16B 7/10* (2006.01)
*E06C 7/08* (2006.01)

(58) Field of Classification Search
USPC ........................................................ 182/195
See application file for complete search history.

(56) References Cited

U.S. PATENT DOCUMENTS

| | | | |
|---|---|---|---|
| 1,045,957 A | 12/1912 | Dicks | |
| 1,712,942 A | 5/1929 | Smith | |
| 2,127,035 A | 8/1938 | Kirlin | |
| 2,194,856 A | 3/1940 | Kostuk | |
| 2,827,216 A | 3/1958 | Napolitano | |
| 2,993,561 A | 7/1961 | Watson | |
| 3,033,309 A | 5/1962 | Fugere | |
| 3,085,651 A | 4/1963 | Rich | |
| 3,085,652 A | 4/1963 | Rich | |
| 3,451,506 A | 6/1969 | Neal | |
| 3,643,292 A | 2/1972 | Mayer | |
| 3,653,463 A | 4/1972 | Neal | |
| 3,858,684 A | 1/1975 | Goings | |
| 4,002,223 A | 1/1977 | Bernkrant | |
| 4,086,980 A | 5/1978 | Shortes et al. | |
| 4,100,448 A | 7/1978 | Chipner et al. | |
| D248,839 S | 8/1978 | Turner | |
| 4,119,177 A | 10/1978 | Andersson | |
| 4,152,810 A | 5/1979 | Martinez | |
| 4,182,431 A | 1/1980 | Wing | |
| D254,630 S | 4/1980 | Aberer et al. | |
| 4,376,470 A | 3/1983 | Ashton | |
| 4,429,766 A | 2/1984 | Alimbau | |
| 4,448,283 A | 5/1984 | Marques | |
| 4,457,391 A | 7/1984 | Marques | |
| 4,483,415 A | 11/1984 | Disston et al. | |
| 4,549,632 A | 10/1985 | Inoue | |
| 4,566,150 A | 1/1986 | Boothe | |
| 4,574,918 A | 3/1986 | Marques | |
| 4,627,149 A | 12/1986 | Colas | |
| 4,770,559 A | 9/1988 | Yoo | |
| 4,926,967 A | 5/1990 | Baker et al. | |
| 4,967,484 A | 11/1990 | Nosek | |
| 4,989,692 A * | 2/1991 | Min | E06C 1/125 182/166 |
| 5,058,239 A | 10/1991 | Lee | |
| 5,074,377 A | 12/1991 | Krause | |
| 5,142,739 A | 9/1992 | Lin | |
| 5,417,511 A | 5/1995 | Warden | |
| 5,492,430 A | 2/1996 | Jones | |
| 5,495,915 A | 3/1996 | Weston et al. | |
| 5,577,574 A | 11/1996 | Joseph | |
| 5,577,722 A | 11/1996 | Glassberg | |
| 5,593,239 A | 1/1997 | Sallee | |
| 5,603,435 A | 2/1997 | Fenwick | |
| 5,620,272 A | 4/1997 | Sheng | |
| 5,645,140 A | 7/1997 | Mouneimneh | |
| 5,654,140 A | 8/1997 | Persico et al. | |
| 5,738,186 A | 4/1998 | Jones | |
| 5,743,355 A | 4/1998 | McDonnell et al. | |
| 5,775,460 A | 7/1998 | Stone | |
| 5,803,290 A | 9/1998 | Bongiomo | |
| 5,924,658 A | 7/1999 | Shiery et al. | |
| 5,954,157 A | 9/1999 | Grimes et al. | |
| 5,992,566 A | 11/1999 | Yeh | |
| 6,006,399 A | 12/1999 | Massaro | |
| 6,006,952 A | 12/1999 | Lucas | |
| 6,343,406 B1 | 2/2002 | Yeh | |
| 6,361,002 B1 | 3/2002 | Cheng | |
| 6,402,330 B1 | 6/2002 | Scheidegg | |
| D462,453 S | 9/2002 | Johansson | |
| 6,461,074 B2 | 10/2002 | Taylor | |
| 6,520,291 B2 | 2/2003 | Andrey | |
| 6,676,095 B2 | 1/2004 | Dal Pra' | |
| 6,708,800 B2 | 3/2004 | Kieffer et al. | |
| 6,857,503 B2 | 2/2005 | Simpson et al. | |
| 6,883,645 B2 | 4/2005 | Kieffer et al. | |
| 6,993,808 B1 | 2/2006 | Bennett et al. | |
| 6,999,253 B1 | 2/2006 | Niwa et al. | |
| 7,007,344 B2 | 3/2006 | Lee | |
| 7,047,597 B2 | 5/2006 | Lee | |
| 7,048,094 B2 | 5/2006 | Kieffer et al. | |
| 7,140,072 B2 | 11/2006 | Leng | |
| 7,306,075 B2 | 12/2007 | Winslow et al. | |
| 7,364,017 B2 | 4/2008 | Moss et al. | |
| 7,424,933 B2 | 9/2008 | Weiss | |
| 8,056,679 B2 | 11/2011 | Hong | |
| 8,104,580 B2 | 1/2012 | Eriksson | |
| 8,225,906 B2 | 7/2012 | Kieffer et al. | |
| 8,348,015 B2 | 1/2013 | Parker | |
| 8,381,873 B2 | 2/2013 | Cross et al. | |
| 8,387,753 B2 | 3/2013 | Kieffer et al. | |
| 8,591,444 B2 | 11/2013 | Bejarano et al. | |
| 8,869,939 B2 | 10/2014 | Kuo et al. | |
| 9,126,622 B2 | 9/2015 | Hebenslreit et al. | |
| 9,416,591 B2 | 8/2016 | Kieffer et al. | |
| 9,580,959 B2 | 2/2017 | Kieffer et al. | |
| 10,233,692 B2 | 3/2019 | Kieffer et al. | |
| 2003/0012595 A1 | 1/2003 | Park et al. | |
| 2003/0029676 A1 | 2/2003 | Gibson et al. | |
| 2003/0062219 A1 | 4/2003 | Yeh | |
| 2003/0079356 A1 | 5/2003 | Crain et al. | |
| 2003/0127288 A1 | 7/2003 | Ed | |
| 2003/0188923 A1 | 10/2003 | Moss | |
| 2003/0217888 A1 | 11/2003 | Simpson et al. | |
| 2004/0020718 A1* | 2/2004 | Kieffer | E06C 7/083 182/195 |
| 2004/0129497 A1 | 7/2004 | Weiss | |
| 2004/0195043 A1 | 10/2004 | Johansson | |
| 2005/0268434 A1 | 12/2005 | Burbrink et al. | |
| 2005/0274571 A1 | 12/2005 | Simpson et al. | |
| 2006/0071040 A1 | 4/2006 | Young | |
| 2006/0155230 A1 | 7/2006 | Mason et al. | |
| 2006/0283664 A1 | 12/2006 | Yao | |
| 2007/0067957 A1 | 3/2007 | Moore | |
| 2007/0201943 A1 | 8/2007 | Yeh | |
| 2007/0209875 A1 | 9/2007 | Chen | |
| 2007/0267252 A1 | 11/2007 | Yao et al. | |
| 2008/0000723 A1 | 1/2008 | Kieffer et al. | |
| 2008/0023269 A1 | 1/2008 | Parker | |
| 2008/0073150 A1 | 3/2008 | Lin | |
| 2008/0109994 A1 | 5/2008 | Liao | |
| 2009/0050407 A1* | 2/2009 | Eriksson | E06C 1/18 182/195 |
| 2009/0065304 A1* | 3/2009 | Jian | E06C 7/083 182/209 |
| 2009/0078503 A1 | 3/2009 | Eriksson | |
| 2010/0071996 A1 | 3/2010 | Huang | |
| 2010/0140436 A1* | 6/2010 | Wu | A47C 7/54 248/354.4 |
| 2010/0258379 A1 | 10/2010 | Mickens | |
| 2010/0270106 A1* | 10/2010 | Chen | E06C 7/087 182/195 |
| 2011/0056764 A1 | 3/2011 | Cross et al. | |
| 2011/0192679 A1* | 8/2011 | Kuo | E06C 7/003 182/108 |
| 2012/0267197 A1 | 10/2012 | Kieffer et al. | |
| 2015/0204138 A1 | 7/2015 | Weston | |
| 2015/0315844 A1 | 11/2015 | Miao | |
| 2016/0032648 A1* | 2/2016 | Nielsen | E06C 1/125 182/195 |
| 2019/0093428 A1 | 3/2019 | Kieffer et al. | |

FOREIGN PATENT DOCUMENTS

| | | |
|---|---|---|
| CN | 2070807 U | 2/1991 |
| CN | 2610056 Y | 4/2004 |
| CN | 200952346 Y | 9/2007 |
| CN | 200978618 Y | 11/2007 |
| CN | 201318118 Y | 9/2009 |
| CN | 107075905 A | 8/2017 |
| DE | 4408095 A1 | 9/1995 |
| DE | 19501689 A1 | 8/1996 |
| DE | 19530452 A1 | 2/1997 |
| DE | 20207715 U1 | 9/2003 |

(56) References Cited

FOREIGN PATENT DOCUMENTS

| | | | |
|---|---|---|---|
| DE | 202013009466 U1 | 11/2013 | |
| EP | 1402143 A1 | 3/2004 | |
| EP | 1516999 A2 | 3/2005 | |
| EP | 1728966 A1 | 12/2006 | |
| EP | 1816312 A2 | 8/2007 | |
| EP | 3211174 A1 * | 8/2017 | ............ E06C 7/086 |
| JP | 2010024799 A | 2/2010 | |
| TW | M248901 U | 11/2004 | |
| WO | 9115651 A1 | 10/1991 | |
| WO | WO-9115651 A1 * | 10/1991 | ............ E06C 1/125 |
| WO | 9302271 A1 | 2/1993 | |
| WO | 9523907 A1 | 9/1995 | |
| WO | 02101189 A1 | 12/2002 | |
| WO | 2004044365 A2 | 5/2004 | |
| WO | 2005045172 A1 | 5/2005 | |
| WO | 2006082032 A1 | 8/2006 | |
| WO | 2006128845 A1 | 12/2006 | |
| WO | 2008064532 A1 | 6/2008 | |
| WO | 2009057995 A1 | 5/2009 | |

OTHER PUBLICATIONS

International Patent Application No. PCT/US2018/059199, International Search Report and Written Opinion dated Feb. 25, 2019, 11 pages.

* cited by examiner

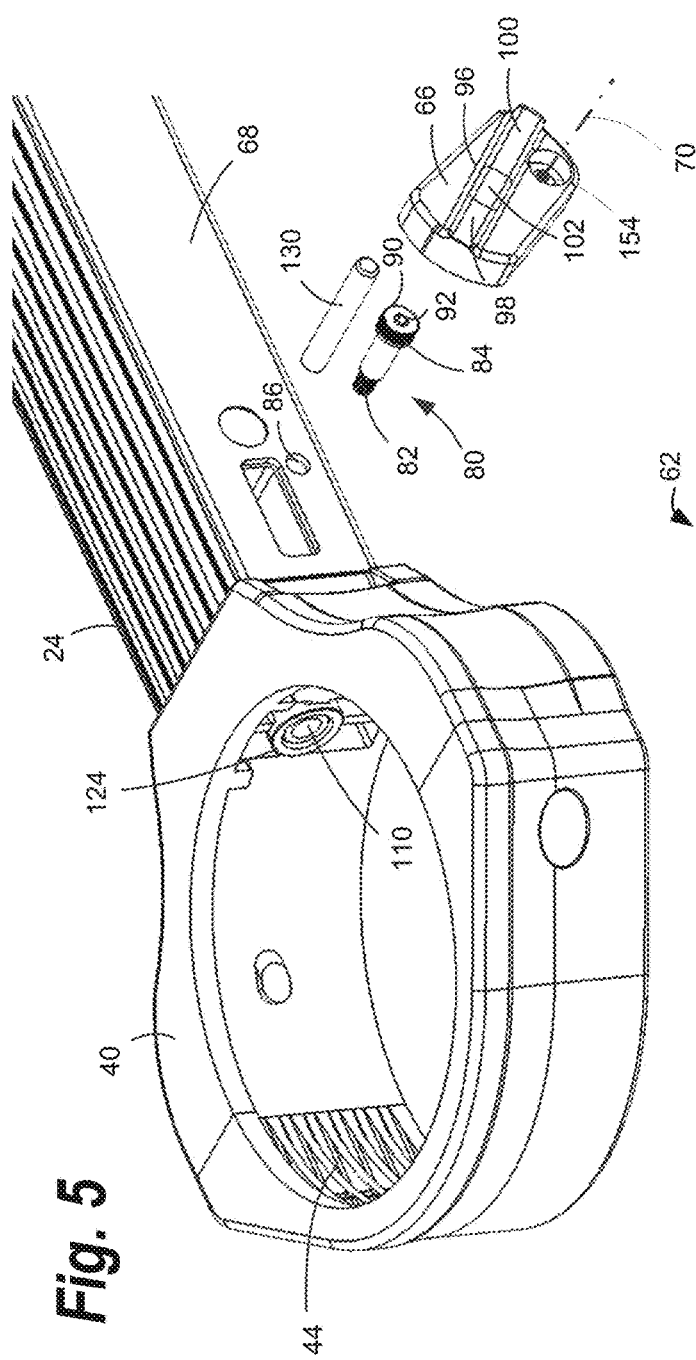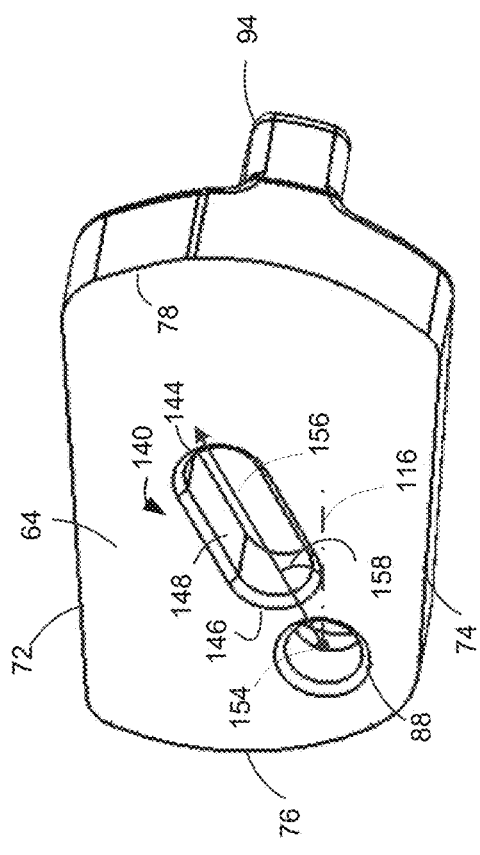
Fig. 5
Fig. 6

LOCKING ASSEMBLY FOR A TELESCOPING LADDER

RELATED MATTERS

This application claims priority to U.S. Provisional Application No. 62/583,230, filed on Nov. 8, 2017, the entire contents of which are incorporated by reference in their entirety.

BACKGROUND

Ladders typically include rungs supported between stiles formed from a plurality of columns. In some cases, the ladder can be a telescoping ladder and can be expanded to separate the columns from one another for extension of the ladder, or collapsed together for retraction of the ladder.

SUMMARY

In an aspect, this disclosure provides a telescoping ladder. The ladder can have a first stile and a second stile each having a plurality of columns disposed in a nested arrangement for relative axial movement in a telescopic fashion along a column axis of the plurality of columns between a fully-extended position and a collapsed position. The ladder can have a plurality of rungs extending between the first stile and the second stile, and connected to a column of the first stile and a column of the second stile. The ladder can have a plurality of locking assemblies.

In another aspect, the disclosure provides a locking assembly for locking adjacent columns to a rung of a telescoping ladder and thereby restricting relative sliding motion between adjacent columns. The locking assembly can have a locking button engageable with a rung front surface. The locking button can be positionable against the rung front surface such that the locking button is generally parallel to and facing the rung front surface. The locking button can be rotatable with respect to the rung front surface about a rotational axis, between a locked position and an unlocked position. The locking assembly can have a locking pin positioned within the rung and slidable between an extended position and a retracted position along a locking pin axis generally perpendicular to the rotational axis. The locking assembly can have a connector pin extending in a direction parallel to the rotational axis, for connecting the locking button to the locking pin such that rotation of the locking button about the rotational axis slides the locking pin about the locking pin axis.

In aspects of this disclosure, when the locking button is in the locked position, the locking pin is in the extended position, and when the locking pin is in the unlocked position, the locking pin is in the retracted position.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is an exploded perspective view of a locking assembly usable with the rung of FIG. 2 according to an embodiment;

FIG. 6 is an exploded perspective rear view of a locking button shown in FIG. 5;

DETAILED DESCRIPTION

Figure 1A:
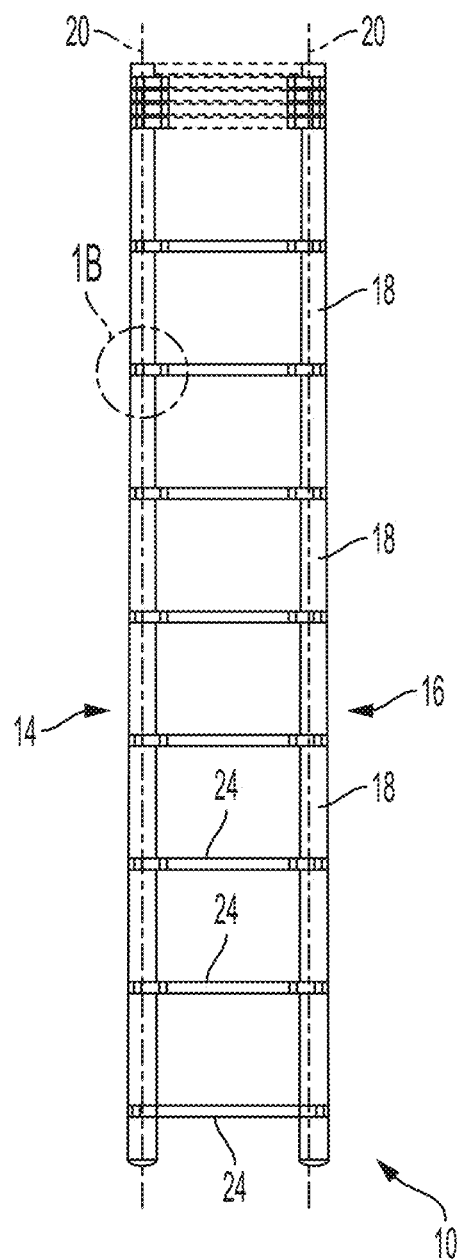
FIG. 1A is a perspective view of a telescoping ladder according to an embodiment with the rungs shown in a collapsed position.

FIG. 1A is a perspective view of a telescoping ladder 10 according to an embodiment. Referring to FIG. 1A, the telescoping ladder 10 comprises a first stile 14 and a second stile 16 (e.g., left hand and right hand stiles illustrated in FIG. 1A). The first and second stiles each have a plurality of columns 18 disposed in a nested arrangement for relative axial movement in a telescopic fashion along a column axis 20 of the plurality of columns 18 between an extended position and a collapsed position. For instance, in FIG. 1A, an upper portion of the ladder 10 is shown in a collapsed position where the columns 18 are nested within each other along the column axis 20 of the columns 18 in a telescoping fashion while the lower portion is shown in an extended position.

Figure 1B:
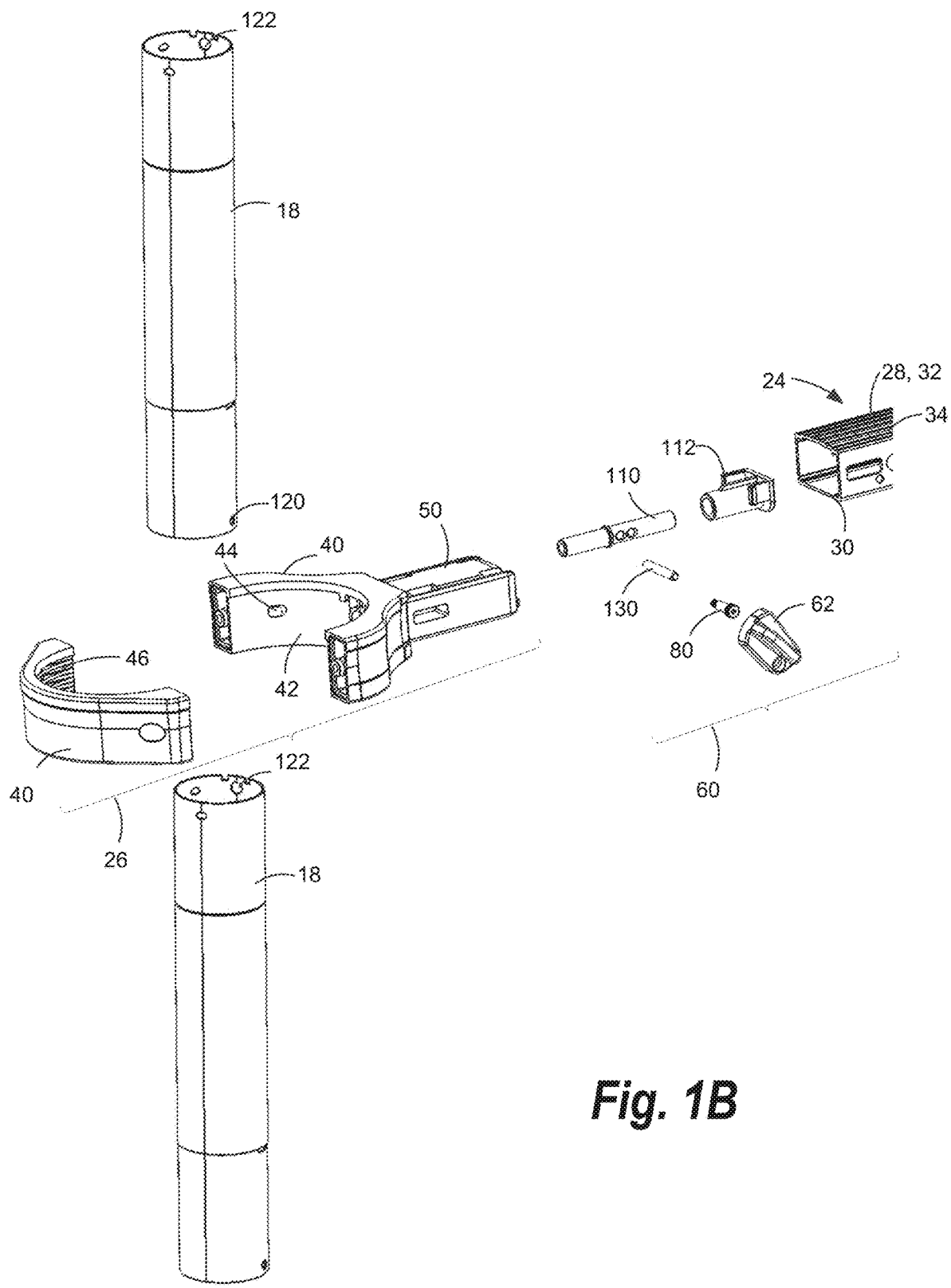
FIG. 1B is an exploded perspective view of a single rung and two adjacent columns along with the connector assembly.

As seen in FIG. 1A-1B, the ladder 10 comprises a plurality of rungs 24 extending between the first stile 14 and the second stile 16. Each rung 24 can be connected to a column 18 of the first stile 14 and a column 18 of the second stile 16. As shown in FIG. 1A, each rung 24 can be connected to the columns 18 by a connector assembly 26 as will be described later. With continued reference to FIG. 1A, in some cases, each rung 24 comprises a generally planar first surface 28 and a generally planar second surface 30 opposite to the planar first surface 28. The first surface 28 of each rung 24 defines a planar standing surface 32. Referring to FIGS. 1A and 1B, when the ladder 10 is extended for use and leaned against a wall, a user may step on the planar first surface 28. The planar standing surface 32 may comprise treads 34 defined thereon to provide friction between the planar standing surface 32 and the contact surface of a user (e.g., soles of the user's shoes).

As will be described further, the rungs 24 can be substantially hollow so as to allow a connector assembly 26 to fasten the rung 24 to a column 18 on each of the right-hand stile and left-hand side stile. Additionally, the hollow body of the rungs 24 allow a pair of latch assemblies (not shown) to be housed in the rung 24 to connect the rung 24 to a column 18. The rungs 24 can be extruded from aluminum, although other materials and means of manufacturing can also be used. Rungs 24 can have different cross-sectional shapes such as those illustrated in U.S. Pat. Nos. 9,580,959 and 9,416,591 B2, assigned to the assignee of the instant application, the disclosure of which is hereby incorporated by reference in its entirety.

Figure 2:
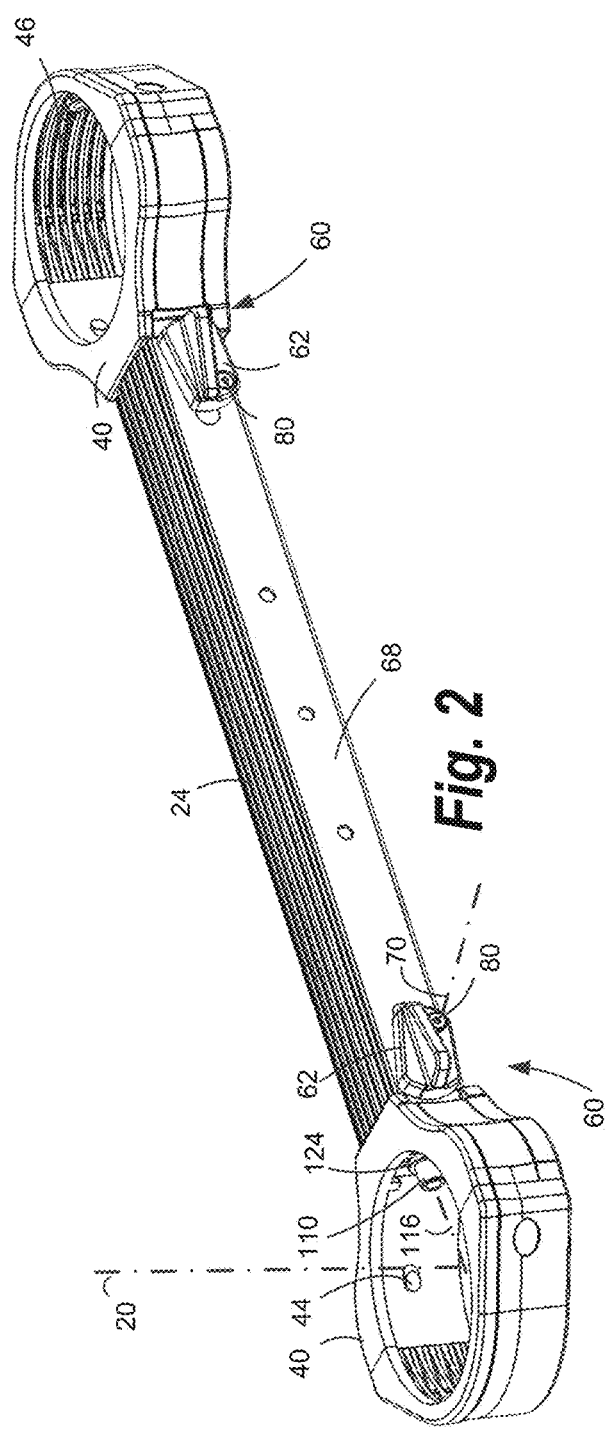
FIG. 2 is a perspective view of a single rung along with a pair of connector assemblies showing the locking assembly in a locked state according to an embodiment.
Figure 4:
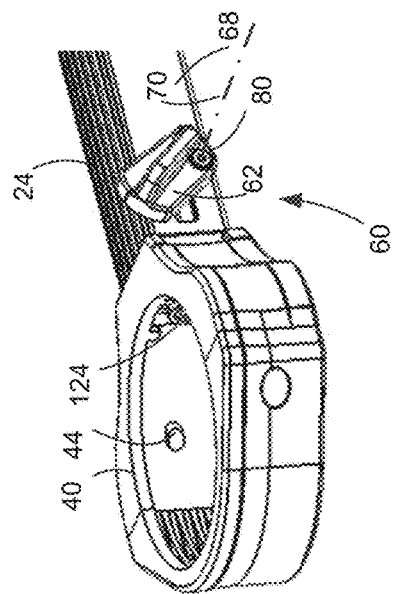
FIG. 4 is a perspective view of a portion of the rung of FIG. 2 with the locking assembly in the unlocked state.
Figure 3:
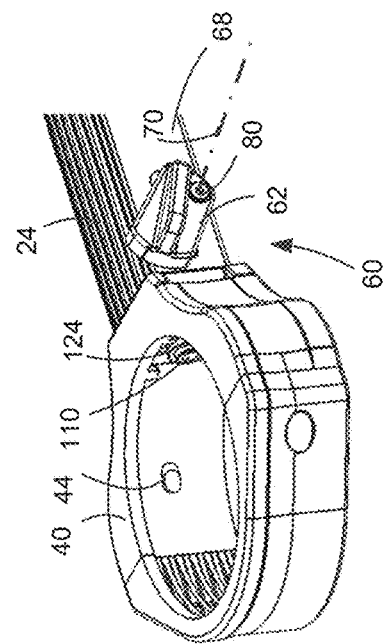
FIG. 3 is a perspective view of a portion of the rung of FIG. 2 with the locking assembly in an intermediate state between the locked and unlocked states.

FIGS. 2-4 provide further details regarding the construction of connector assembly 26, according to some embodiments of the present disclosure. Connector assembly 26 may be representative of all connector assemblies in ladder 10, although connector assemblies on the right stile may be a mirror image of connector assembly 26 on the left stile. As shown by these figures, the connector assembly 26 is formed and assembled as disclosed in U.S. Pat. Nos. 6,883,645, 8,225,906, 9,580,959 and 9,416,591, assigned to the assignee of the instant application, the disclosure of each of which is hereby incorporated by reference in its entirety.

In some exemplary embodiments, as seen from FIG. 1B, the connector assembly 26 forms a collar portion 40 and a rung portion 50. The rung portion 50 of the connector assembly 26 can be inserted into the open end of a rung 24, while the collar portion 40 connects around an end of a column 18. As perhaps best seen in FIGS. 1B and 2, the collar portion 40 has an interior surface 42 that can include one or more tabs 44 that are inserted into corresponding openings located near the end of column 18. The tabs 44 help fasten the collar portion 40 around the entire column 18. As illustrated therein, in some exemplary embodiments, the interior surface 42 of the collar portion 40 can also include a plurality of ribs 46. In some embodiments, the ribs 46 are distributed around the interior surface 42 of the collar portion 40. The ribs 46 can create a friction fit with the end of the column 18 when the collar portion 40 is pushed around the end of the column 18. The friction fit helps fasten the collar portion 40 around the entire end of the column 18.

FIGS. 2-4 illustrate a single rung 24 and a connector assembly 26 according to a non-limiting exemplary embodiment. As seen from FIGS. 2-4, in certain embodiments, the ladder 10 includes a locking assembly 60 for locking adjacent columns 18 to a rung 24 of the telescoping ladder 10. When locked by the locking assembly 60, relative sliding (telescoping) motion between adjacent columns 18 can be restricted. FIG. 2 illustrates the locking assembly 60 in the locked state. FIG. 3 illustrates the locking assembly 60 in a position between the locked state and the unlocked state, whereas FIG. 4 illustrates the locking assembly 60 in the unlocked state.

As seen from FIGS. 2-4, in some embodiments, the locking assembly 60 includes a locking button 62 engageable with a rung 24 front surface. In certain exemplary embodiments, the locking button 62 can be manufactured by molding a thermoplastic material such as ABS plastic or a glass filled nylon such as PA6-GF30%. Other materials are contemplated.

The locking button 62 can include a button rear surface 64 and a button front surface 66 opposite to the button rear surface 64. The button rear surface 64 is illustrated as being generally planar. The locking button 62 is positionable against a generally planar rung front surface 68 such that the button rear surface 64 is generally parallel to and facing the rung 24 front surface. The locking button 62 can be rotatable with respect to the rung 24 front surface about a rotational axis 70, between a locked position and an unlocked position. In FIG. 2, the locking button 62 is in the locked position.

FIG. 3 illustrates the locking button 62 in an intermediate position between the locked position and the unlocked position, whereas FIG. 4 illustrates the locking assembly 60 in the unlocked position. The columns 18 of the ladder 10 can be locked with respect to each other when the locking button 62 is in the locked position such that relative axial movement between the columns 18 is restricted. Conversely, columns 18 of the ladder 10 can be unlocked with respect to each other when the locking button 62 is in the unlocked position such that relative axial movement between the columns 18 is permitted.

In an exemplary embodiment, the button rear surface 64 can be mounted flush against the rung 24 front surface to provide a more secure connection. Accordingly in such embodiments, the button rear surface 64 contacts the rung 24 front surface when the locking button 62 is engaged to the rung 24 front surface. Alternatively, the locking button 62 may be spaced apart from the rung 24 front surface by a small clearance distance so as to encounter less frictional resistance when the locking button 62 is rotated between its unlocked position and locked position.

As seen in FIGS. 5-6, the button rear surface 64 comprises a top edge 72, a bottom edge 74 parallel and opposite to the top edge 72, and side edges (first side edge 76 and second side edge 78) extending between the top edge 72 and the bottom edge 74. The top, bottom and side edges 76, 78 can, in certain embodiments, form outermost boundaries of the button rear surface 64 such that the button rear surface 64 is bounded by the top edge 72, bottom edge 74 and side edges 76, 78. While the illustrated embodiment shows the locking button 62 as having a generally rectangular shape, other shapes (such as round or oval) are contemplated within the present disclosure.

In certain non-limiting exemplary embodiments, and with continued reference to FIGS. 5 and 6 the locking assembly 60 comprises a fastening pin 80 for engaging the locking button 62 to the rung 24 front surface. The fastening pin 80 comprises a first end 82 and a second end 84 opposite to the first end 82. As shown in FIG. 5, the first end 82 of the fastening pin 80 can be positionable in an opening 86 on the rung 24 front surface. In advantageous aspects of the present disclosure the first end 82 can include threads to securely engage with the opening 86 on the rung 24 front surface. In the alternative, the first end 82 of the fastening pin 80 can simply be push fitted to the opening 86 of the rung 24 front surface so as to frictionally engage therewith.

As seen in FIGS. 5 and 6, the locking button 62 comprises an aperture 88. The second end 84 of the fastening pin 80 can be frictionally engageable with the aperture 88 of the locking button 62. Alternatively, in other embodiments, the locking button 62 can be welded to or integrally formed with the fastening pin 80. Still further, in certain embodiments, the locking button 62 can be fastened to the fastening pin 80 by a fastener. As seen in FIG. 5, the rotational axis 70 of the locking button 62 passes centrally through the fastening pin 80 and the aperture 88, such that the locking button 62 rotates about and relative to the fastening pin 80.

With continued reference to FIG. 5, the fastening pin 80 can include a head portion 90 that protrudes through the aperture 88 of the locking button 62. The head portion 90 can include an access port 92 to permit fastening (e.g., torqueing) the fastening pin 80 to the locking button 62 and the rung 24. In an exemplary embodiment, the access port 92 can be in the form of a hexagonal opening so as to permit a tool (e.g., Allen wrench) to engage with and apply torque to the head portion 90 of the fastening pin 80 so as to drive the threads on the first end 82 of the fastening pin 80 into the opening 86 on the rung 24. In the illustrated embodiment, the head portion 90 is shaped as a counter-sunk screw so as to rest within the aperture 88 on the locking button 62. Accordingly, in such examples, the head portion 90 of the fastening pin 80 may not protrude past the button front surface 66. Alternatively, the head portion 90 may be formed in other shapes, or be integral to (and protruding out of) the button rear surface 64 and/or button front surface 66.

As seen in a non-limiting exemplary embodiment of FIGS. 5 and 6, as mentioned previously, the locking button 62 comprises a button front surface 66 opposite to the button rear surface 64. The button front surface 66 can include a rotating knob 94 graspable and rotatable to rotate the locking button 62 about the rotational axis 70. In the illustrated embodiment, the rotating knob 94 is integrally formed with and stationary relative to the button front surface 66 when the locking button 62 and/or the rotating knob 94 is rotated. Alternatively, in other embodiments, the rotating knob 94 can be a separate component engaging frictionally or by a fastener with the locking button 62.

In an aspect, the rotating knob 94 is generally elongate and can extend an entire length of the locking button 62 to permit ease of grasping (for instance, for operators having large fingers). Alternatively, the rotating knob 94 can only extend over a portion of the length of the locking button 62. In the illustrated embodiment, the rotating knob 94 extends between the side edges 76, 78 of the locking button 62.

Referring back to FIG. 2, the rotating knob 94 can have a knob bottom surface 96 in contact with the button front surface 66. The rotating knob 94 can also have a first surface 98 and a second surface 100 that adjoin the knob bottom surface 96 so as to form a generally triangular profile when viewed from the top (e.g., in a direction perpendicular to the button front surface 66). The first surface 98 and the second surface 100 can abut to form an apex 102 of the rotating knob 94. Such embodiments provide an adequate amount of surface area to permit a user to grasp and twist the locking button 62. Alternatively, the rotating knob 94 can have a generally rectangular profile when viewed from the top.

In some exemplary embodiments, the rotating knob 94 protrudes past the button front surface 66 to a height above the button front surface 66 (measured in a direction parallel to the rotational axis 70). The height of the rotating knob 94 can be generally non-uniform along the length of the locking button 62 such that the apex 102 forms the highest point on the rotating knob 94 relative to the button front surface 66. In the illustrated embodiment, the apex 102 of the rotating knob 94 can be disposed such that it is separated from the button front surface 66 by a maximum height. In such embodiments, the first surface 98 and the second surface 100 can be generally non-parallel to the bottom surface of the knob. In the illustrated example, the apex 102 is positioned near the first side surface 76 of the locking button 62, whereas the fastening pin 80 is positioned near the second side surface 78 of the locking button 62. Advantageously, as the locking button 62 rotates relative to the fastening pin 80 from its locked position, the apex 102 (which can be the highest point of the rotating knob 94 relative to the button front surface 66) may provide a clear visual indication that the ladder 10 is unlocked. Such embodiments promote safer use of ladders. However, in the alternative, the rotating knob 94 can have a generally uniform height. The particular shape, size and relative dimensions of the rotating knob 94 are illustrative and should not be viewed as limiting.

As seen with respect to FIGS. 2-4, the knob bottom surface 96 is generally parallel to the rung 24 front surface when the locking button 62 is in the locked position. As the locking button 62 is rotated from its locked position, the knob bottom surface 96 is in contact with the button front surface 66 and therefore also rotates. Accordingly, the knob bottom surface 96 becomes generally non-parallel to the rung 24 front surface when locking button 62 is in any position other than the locked position, so as to provide a visual indication that adjacent columns 18 are unlocked with respect to each other as described previously.

Figure 7:
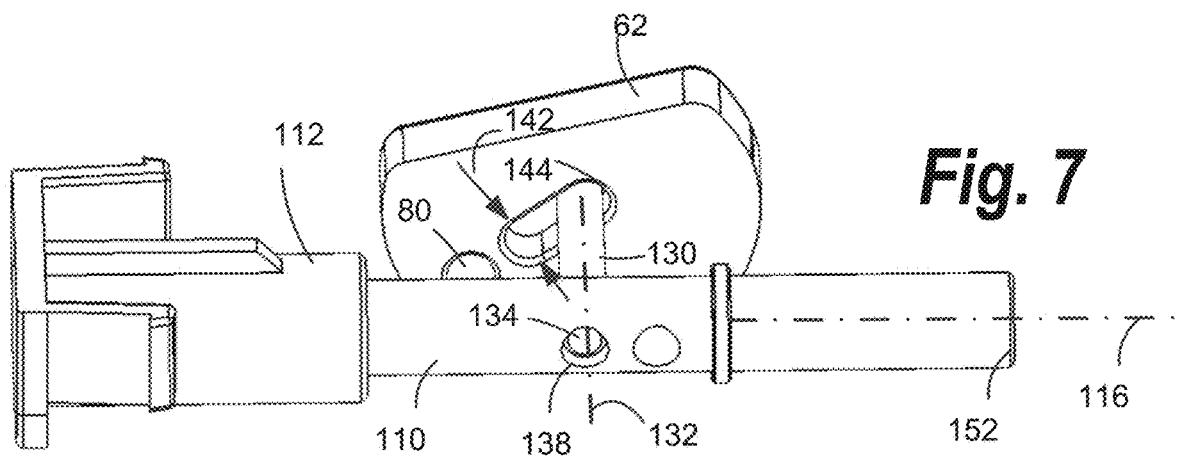
FIG. 7 is a perspective view of portions of the locking assembly of FIG. 2 shown in the locked state.
Figure 8:
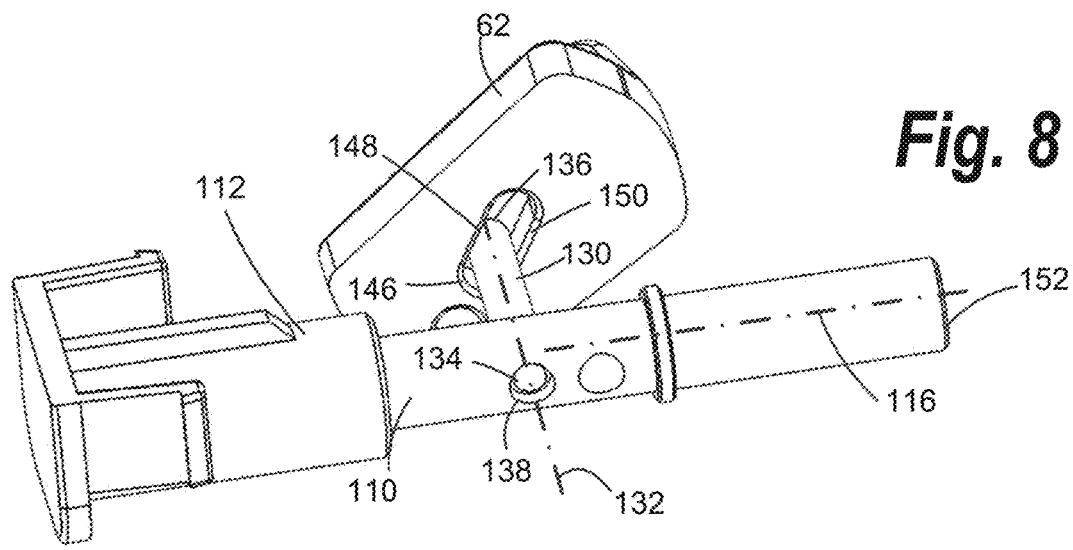
FIG. 8 is a perspective view of portions of the locking assembly of FIG. 2 shown in the intermediate state between the locked and the unlocked states.
Figure 9:
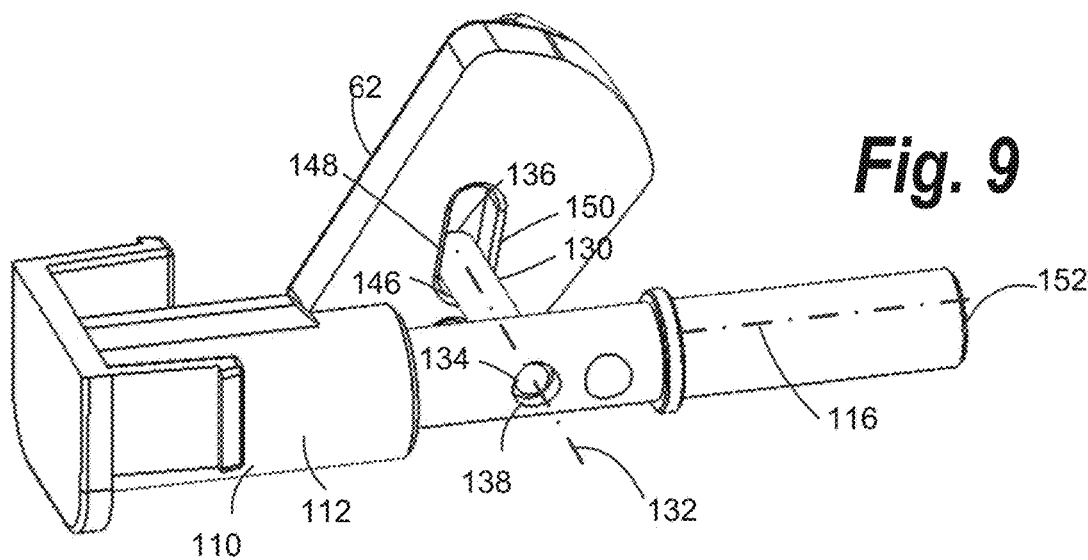
FIG. 9 is a perspective view of portions of the locking assembly of FIG. 2 shown in the unlocked state.

Referring now to FIGS. 7-9, in non-limiting illustrative embodiments, the locking assembly 60 comprises a locking pin 110 positioned within the rung 24. The locking pin 110 can be slidable between an extended position and a retracted position. When the locking button 62 is in the locked position, the locking pin 110 is in the extended position, and when the locking pin 110 is in the unlocked position, the locking pin 110 is in the retracted position. The locking pin 110 can be housed within portions of the rung portion 50 of the connector assembly 26. In an exemplary embodiment, the rung portion 50 includes a pin capture 112 that can spring-bias (e.g., by way of a spring 114 seen in FIGS. 10-12), the locking pin 110 to move between the extended position and the retracted position as described in commonly-assigned disclosure of U.S. Pat. No. 8,225,906, the entire contents of which is hereby incorporated by reference. Appreciably, the pin capture 112 remains stationary (relative to the rung 24) when the locking button 62 is rotated and the locking pin 110 moves between its extended and retracted positions.

Referring again to FIGS. 7-9, the locking pin 110 is generally elongate and disposed about a locking pin axis 116. Appreciably, the locking pin 110 is slidable along the locking pin axis 116 between the extended position and the retracted position. The locking pin axis 116 can be generally perpendicular to the rotational axis 70 of the locking button 62. Additionally, as is apparent from FIGS. 2-4, the locking pin axis 116 of the locking pin 110 is generally perpendicular to the column axis 20. In the extended position, the locking pin 110 protrudes through a pair of correspondingly aligned openings 120, 122 on adjacent columns 18 of the plurality of columns 18 (as seen in FIG. 1B) as well as through a pin opening 124 on the collar portion 40 of the connector assembly 26, thereby locking the adjacent columns 18 with each other. In the retracted position, the locking pin 110 may not protrude through the pin opening 124 on the collar portion 40 of the connector assembly 26 as will be described further below.

With continued reference to FIGS. 7-9, in certain non-limiting embodiments, the locking assembly 60 comprises a connector pin 130 for coupling and/or transmitting the movement of the locking button 62 to the locking pin 110. As seen in FIGS. 7-9, the connector pin 130 can be elongate in shape and can have a connector pin axis 132. The connector pin axis 132 can extend in a direction parallel to the rotational axis 70. The connector pin 130 can couple the locking button 62 to the locking pin 110 such that rotation of the locking button 62 about the rotational axis 70 is transmitted via the connector pin 130 to the locking pin 110 so as to move it along the locking pin axis 116 between the extended position and the retracted position.

As seen in FIGS. 7-9, the connector pin 130 comprises a first pin end 134 and a second pin end 136 opposite to the first pin end 134. As seen in FIGS. 7-9, the locking pin 110 comprises an aperture 138 on its body. The first pin end 134 can frictionally engage with the aperture 138 of the locking pin 110. Alternatively, the connector pin 130 can be welded to or fastened to the aperture 138 of the locking pin 110.

With continued references to the non-limiting illustrative embodiment of FIGS. 7-9, the locking button 62 comprises a slot 140 defined on the button rear surface 64. The second pin end 136 can be receivable in the slot 140. The connector pin 130 can have a size less than a width 142 of the slot 140 to permit relative ease of sliding therein when the locking pin 110 translates between the extended position and the retracted position. The second pin end 136 can be slidable relative to the slot 140 as will be described further below. As such, the second pin end 136 rests in the slot 140 such that torque associated with rotational motion of the locking button 62 is transmitted to the first pin end 134. By way of the frictional engagement between the first pin end 134 and the aperture 138 of the locking pin 110, the transmitted torque results in a force that counters the spring 114-bias of the spring 114 (seen in FIGS. 10-11) to move the pin between the extended position and the retracted position.

In FIG. 7, the locking button 62 is in the locked position and the locking pin 110 is in the extended position. At this instance, the second pin end 136 rests against a first slot end 144 at a first position. In FIG. 8, the locking button 62 is an intermediate position between the locked position and the unlocked position, and the locking pin 110 is in an intermediate position between the extended position and the retracted position. At this instance, the second pin end 136 is in between the first slot end 144 and a second (opposite) slot end 146. In FIG. 9, the locking button 62 is the unlocked position and the locking pin 110 is in the retracted position. At this instance, the second pin end 136 is in the second slot end 146 in a second position. Appreciably, the second slot end 146 is opposite to the first slot end 144.

The slot 140 can have a first guide surface 148 and a second guide surface 150 each extending between the first slot end 144 and the second slot end 146. The first guide surface 148 and the second guide surface 150 can guide the connector pin 130 when the locking button 62 is rotated and/or the locking pin 110 slides in response to the rotation of the locking button 62. The first guide surface 148 and the second guide surface 150 can each be non-parallel with respect to the top and/or bottom edge 74 of the button rear surface 64. Thus, the first guide surface 148 and the second guide surface 150 can form a non-zero angle with respect to the top edge 72 and/or bottom edge 74 of the button rear surface 64. Advantageously, such embodiments effectively convert the torque associated with the rotation of the locking button 62 into a force to translate the locking pin 110 between the extended position and the retracted position, thereby providing the user with adequate leverage to lock or release the columns 18. Appreciably, as a result of angled first and second guide surfaces, the connector pin 130 slides along a direction non-parallel to the bottom edge 74 of the rear surface.

Referring back to FIG. 6, the rotational axis 70 passes through a rotational point 154. In the illustrated embodiment, the rotational point 154 is defined on the aperture 88 of the locking button 62. As seen from FIG. 6, the slot 140 extends in a slot direction 156 away from the rotational point 154. Appreciably, as seen from FIGS. 5 and 6, the slot 140 direction forms an initial acute angle 158 with the locking pin axis 116 when in the locked position. As the locking button 62 rotates about the rotational axis 70 and/or the rotational point 154 to the unlocked position, the locking pin axis 116 remains rotationally stationary. Accordingly, the value of the initial acute angle 158 increases as the locking button 62 rotates from the locked position to the unlocked position about the rotational axis 70.

Figure 10:
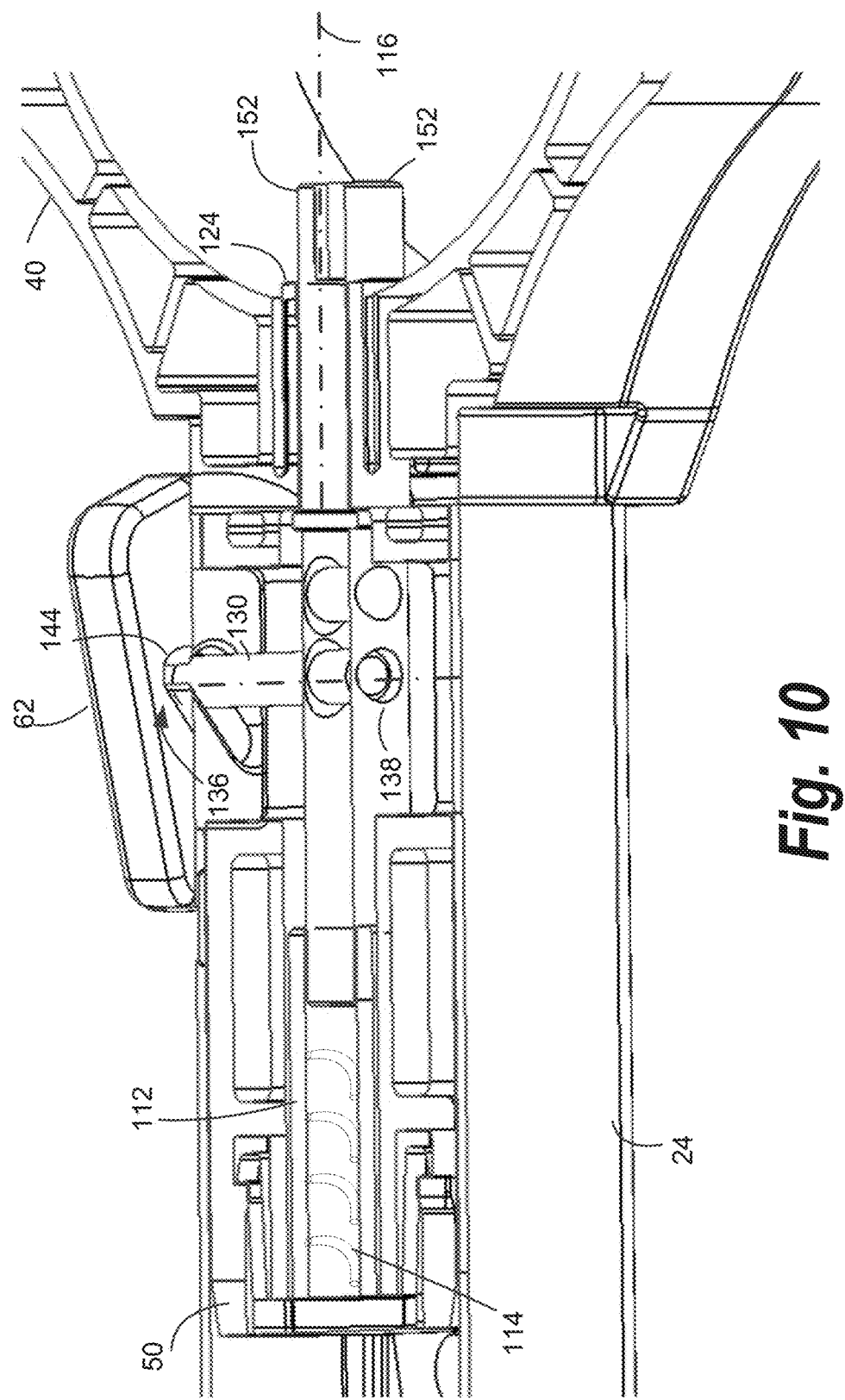
FIG. 10 is a cross-sectional perspective view of portions of the locking assembly taken along the plane 10-10 shown in FIG. 2.
Figure 11:
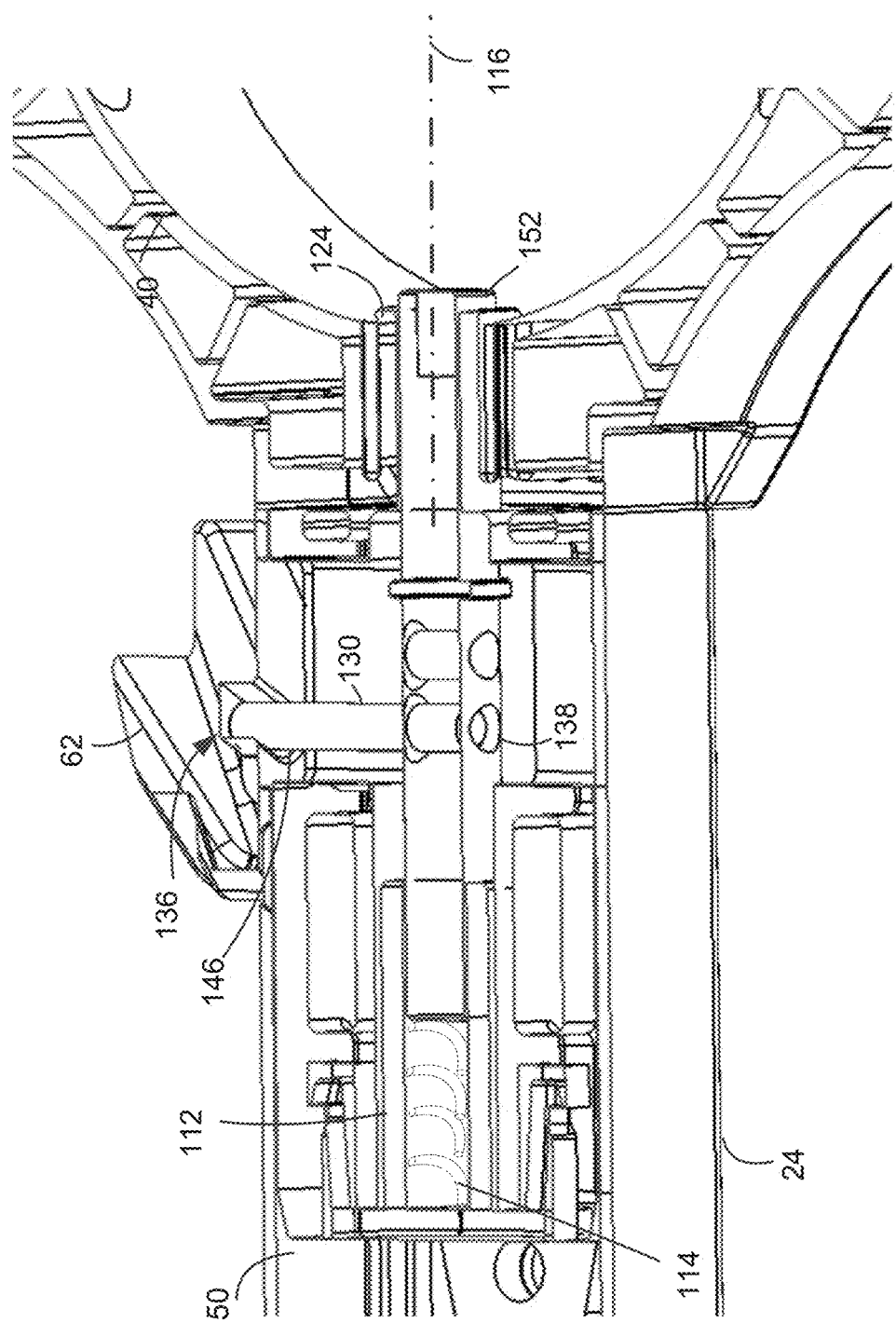
FIG. 11 is a cross-sectional perspective view of portions of the locking assembly taken along the plane 11-11 shown in FIG. 3.
Figure 12:
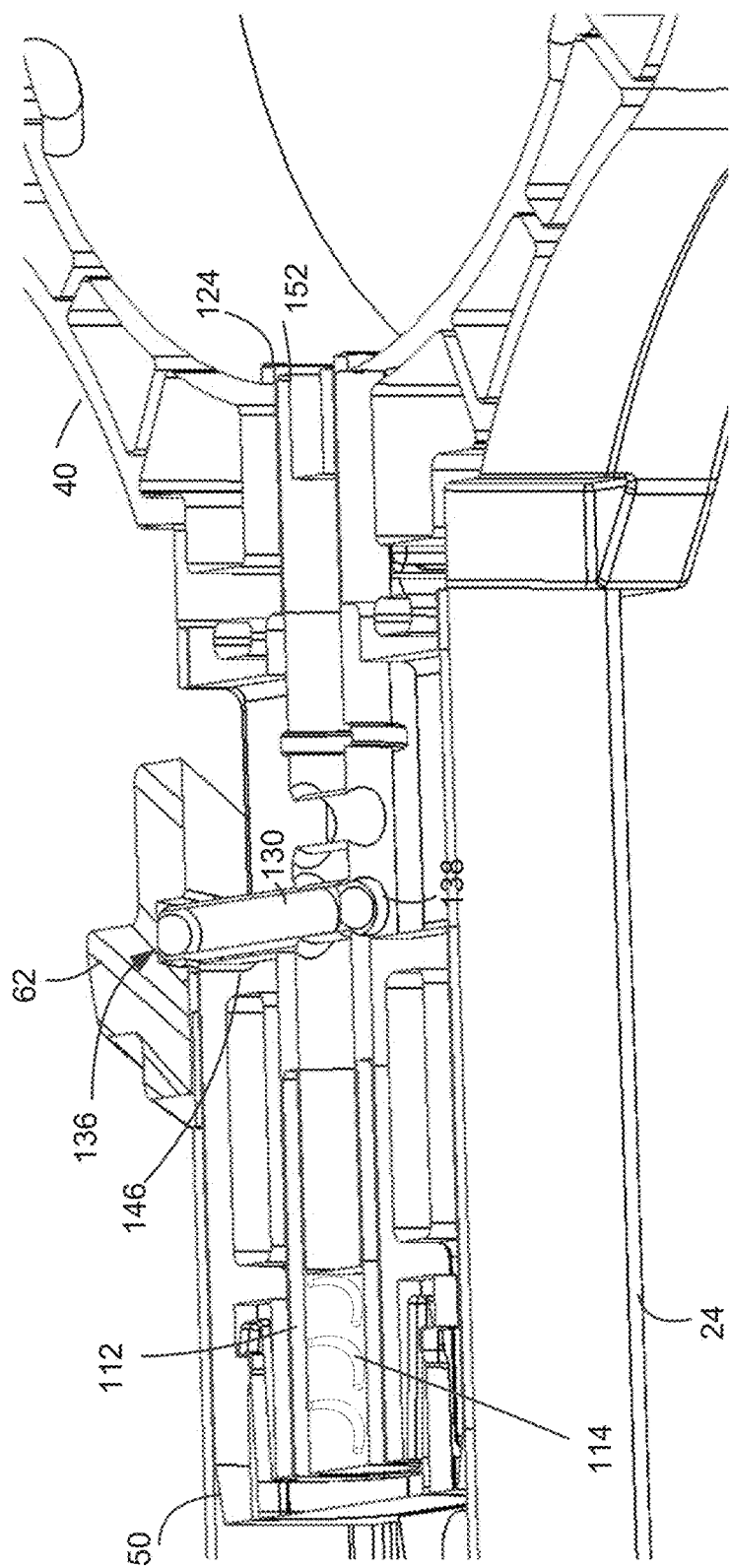
FIG. 12 is a cross-sectional perspective view of portions of the locking assembly taken along the plane 12-12 shown in FIG. 4.

FIGS. 10-12 are cross-sectional views of a portion of the connector assembly 26 to illustrate interior details of the locking assembly 60. Referencing FIG. 10, the locking button 62 is in the locked position, and correspondingly, the locking pin 110 extends through the pin opening 124 on the collar portion 40 of the connector assembly 26. The second pin end 136 abuts against the first slot end 144. The connector pin 130 is thus positioned in its first position. The spring 114 (housed in the pin capture 112) is in the least compressed state relative to its position in each of FIGS. 11 and 12 (as will be described further below).

FIG. 11 is another sectional view illustrating interior details of the locking assembly 60. Referencing FIG. 11, the locking button 62 is in an intermediate position between the locked position and the unlocked position. The locking pin 110 protrudes through the pin opening 124 on the collar portion 40 of the connector assembly 26, though, the length of the locking pin 110 that protrudes through the pin opening 124 is less than the length of the locking pin 110 protruding through the pin opening 124 in the locked position (seen in FIG. 10). Referring again to FIG. 11, the second pin end 136 travels along the first guide surface 148 and the second guide surface 150 and approaches the second slot end 146 of the locking button 62. The spring 114 (housed in the pin capture 112) is in a more compressed state relative to its position in FIG. 10.

FIG. 12 is another sectional view illustrating interior details of the locking assembly 60. Referencing FIG. 12, the locking button 62 is in the unlocked position. Correspondingly, the locking pin 110 does not protrude through the pin opening 124 on the collar portion 40 of the connector assembly 26. For instance, a terminal end 152 of the locking pin 110 is positioned further away from the pin opening 124 of the collar portion 40, as seen in FIG. 12 (relative to its position in FIGS. 10 and 11). At this position, the second pin end 136 abuts the second slot end 146 of the locking button 62. The connector pin 130 is thus positioned in its second position. The spring 114 (housed in the pin capture 112) is in a more compressed state relative to its position in each of FIGS. 10 and 11.

In advantageous aspects, the spring 114 can bias the locking pin 110 to return to the retracted position. Accordingly, in such aspects, locking button 62 need only be rotated slightly toward the unlocked position before the spring 114 bias pushes the pin back to the retracted position. Thus, in such embodiments, the torque to move the locking pin 110 from the extended position to the retracted position can be less than the torque to move (and thereby counter the spring 114 bias of) the locking pin 110 from the retracted position to the extended position. In alternative embodiments, the spring 114 can bias the locking pin 110 to be return to the extended position, in which case, locking button 62 need only be rotated slightly toward the locked position before the spring 114 bias pushes the pin to the extended position. Thus, in such embodiments the torque to move the locking pin 110 from the retracted position to the extended position can be less than the torque to move (and thereby counter the spring 114 bias of) the locking pin 110 from the extended position to the retracted position. Such embodiments offer ease of use of the ladder 10 to a wide variety of operators with different physical abilities.

During use, in certain embodiments, the ladder 10 can be extended by grasping the rung 24 so as to telescopically extend each column 18 relative to an adjacent column 18 (for instance, all columns 18 except the bottom-most or the bottom-few columns 18). Once a column 18 of the first stile 14 and the second stile 16 are each extended relative to adjacent columns 18 of the first stile 14 and the second stile 16 respectively, the columns 18 can each be locked to restrict relative axial (telescopic sliding) movement with respect to adjacent columns 18. This can be done by grasping the rotating knob 94 of the locking assembly 60 on the right and left sides (e.g., near each of the stiles) and turning it in a first direction (e.g., counter-clockwise) to move the locking button 62 from its unlocked position to the locked position. The first direction can correspond to rotation of the locking button 62 by an angle of between about 5 degrees and about 60 degrees relative to its position in the unlocked position. In the illustrated embodiment, the rotation of the locking button 62 along the first direction corresponds to a rotation of about 45 degrees counter-clockwise, though the illustrated angles and direction should not be construed as limiting. The locking pin 110 protrudes through the pin opening 124 of the collar portion 40 and corresponding apertures in the column 18, thereby locking the columns 18 with respect to adjacent columns 18.

To collapse the ladder 10 in a telescopic fashion, the rotating knobs of the locking assembly 60 on the right and left sides (e.g., near each stiles) can be rotated in a second direction. Appreciably, the second direction is opposite to the first direction. The second direction in the illustrated embodiment is clockwise, though, in alternative embodiments, the first and second directions can be reversed. For instance, the first direction can be clockwise and the second direction can be counter-clockwise. The second direction can correspond to rotation of the locking button 62 by an angle of between about 5 degrees and about 60 degrees relative to its position in the locked position. In the illustrated embodiment, the rotation of the locking button 62 along the second direction corresponds to a rotation of about 45 degrees clockwise, though the illustrated angles and direction should not be construed as limiting. The locking pin 110 does not protrude through the pin opening 124 of the collar portion 40 or the corresponding apertures in the column 18, thereby unlocking the columns 18 with respect to adjacent columns 18.

Exemplary embodiments disclosed herein provide a number of technical advantages. The locking assemblies as illustrated herein can promote ease of use by requiring less force than known locking assemblies for telescoping ladders. Such ladders can be easier to use for users with smaller hands or fingers. In addition, locking assemblies as illustrated herein include embodiments that provide a visual indication of whether ladders are locked, thereby improving safety.

Various examples have been described. These and other examples are within the scope of the following claims.

The invention claimed is:

1. A locking assembly for locking adjacent, nested columns of a telescoping ladder to each other, and thereby restricting relative sliding motion between adjacent columns, each column connected to a respective rung to a rung, the locking assembly comprising:
   a locking button comprising a button rear surface and a slot defined on the button rear surface, the button rear surface being generally planar, the locking button being positioned such that the button rear surface is generally parallel to and facing a rung front surface, the locking button being rotatable with respect to the rung front surface about a rotational axis, between a locked position and an unlocked position;
   a locking pin positioned within the rung having a locking pin axis extending centrally therethrough and slidable along the locking pin axis between an extended position and a retracted position, whereby when the locking button is in the locked position, the locking pin is in the extended position, and when the locking pin is in the unlocked position, the locking pin is in the retracted position, the locking pin axis being generally perpendicular to the rotational axis; and
   a connector pin extending in a direction parallel to and offset from the rotational axis, the connector pin comprising a first pin end and a second pin end opposite the first pin end, the second pin end received at the slot and connecting the locking button to the locking pin such that rotation of the locking button about the rotational axis slides the locking pin about the locking pin axis.

2. The locking assembly of claim 1, wherein the button rear surface contacts the rung front surface.

3. The locking assembly of claim 1, wherein the locking pin comprises an aperture, and the first pin end being frictionally received in the aperture of the locking pin.

4. The locking assembly of claim 1, wherein when the locking button is rotated between the locked position and the unlocked position, the connector pin slides in the slot between a first position and a second position.

5. The locking assembly of claim 1, wherein the button rear surface comprises a bottom edge that forms an outermost boundary of the rear surface, the slot being non-parallel to the bottom edge.

6. The locking assembly of claim 5, wherein the connector pin slides in a direction non-parallel to the bottom edge of the rear surface.

7. The locking assembly of claim 1, further comprising a fastening pin for engaging the locking button to the rung front surface.

8. The locking assembly of claim 7, wherein the fastening pin comprises a first end and a second end opposite to the first end, the first end being positionable in an opening on the rung front surface.

9. The locking assembly of claim 8, wherein the locking button comprises an aperture, the second end of the fastening pin being frictionally engageable with the aperture of the locking button.

10. The locking assembly of claim 7, wherein the rotational axis of the locking button passes centrally through the fastening pin, such that the locking button rotates about and relative to the fastening pin.

11. The locking assembly of claim 1, wherein the locking button comprises a button front surface opposite to the button rear surface, the button front surface having a rotating knob graspable and rotatable to rotate the locking button about the rotational axis.

12. The locking assembly of claim 11, wherein the rotating knob is integrally formed with and stationary relative to the button front surface when the locking button and/or the rotating knob is rotated.

13. The locking assembly of claim 11, wherein the rotating knob protrudes past the button front surface.

14. The locking assembly of claim 11, wherein, the rotating knob is generally parallel to the rung front surface when the locking button is in the locked position.

15. The locking assembly of claim 14, wherein the rotating knob is generally non-parallel to the rung front surface when locking button is in any position other than the locked position, so as to provide a visual indication that adjacent columns are unlocked with respect to each other.

16. The locking assembly of claim 1, wherein, the rotational axis passes through a rotational point, the slot extends in a slot direction away from the rotational point, the slot direction forming an initial acute angle with the locking pin axis, whereby, as the locking button rotates about the rotational axis, the initial acute angle increases.

17. A telescoping ladder, comprising:
a first stile,
a second stile, the first and second stiles each having a plurality of columns disposed in a nested arrangement for relative axial movement in a telescopic fashion along a column axis of the plurality of columns between a fully-extended position and a collapsed position, each column having a hollow body, such that when the ladder is collapsed from the fully-extended position, each column substantially nests within another column;
a plurality of rungs extending between the first stile and the second stile, each rung connected to a column of the first stile and a column of the second stile; and
a plurality of locking assemblies, each locking assembly comprising:
a locking button engageable with a front surface of a rung of the plurality of rungs, the locking button comprising a button rear surface and a slot defined on the button rear surface, the button rear surface being generally planar, the locking button being positionable against the rung front surface such that the locking button is generally parallel to and facing the rung front surface, the locking button being rotatable with respect to the rung front surface about a rotational axis, between a locked position and an unlocked position,
wherein, in the locked position, sliding movement between adjacent columns of the plurality of columns is restricted, and in the unlocked position, sliding movement between adjacent columns of the plurality of columns is permitted,
a locking pin positioned within the rung and slidable between an extended position and a retracted position along a locking pin axis, the locking pin axis being generally perpendicular to the rotational axis, and
a connector pin extending in a direction parallel to the rotational axis, the connector pin comprising a first pin end and a second pin end opposite the first pin end, the second pin end received at the slot and connecting the locking button to the locking pin such that rotation of the locking button about the rotational axis slides the locking pin about the locking pin axis,
whereby when the locking button is in the locked position, the locking pin is in the extended position, and when the locking pin is in the unlocked position, the locking pin is in the retracted position.

18. The telescoping ladder of claim 17, wherein the rotational axis of the locking button is generally perpendicular to the column axis.

19. The telescoping ladder of claim 17, wherein the locking pin axis of the locking pin is generally perpendicular to the column axis.

20. The telescoping ladder of claim 17, wherein the locking pin protrudes through a pair of correspondingly aligned openings on adjacent columns of the plurality of columns, thereby locking the adjacent columns with each other.

* * * * *